ABSTRACT OF THE DISCLOSURE

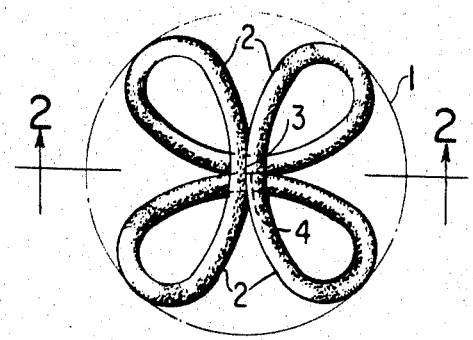
FIG.1
FIG.2
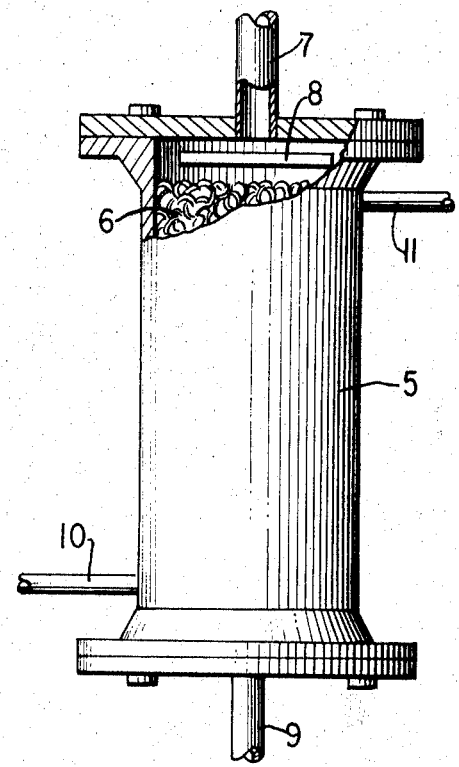
FIG.4
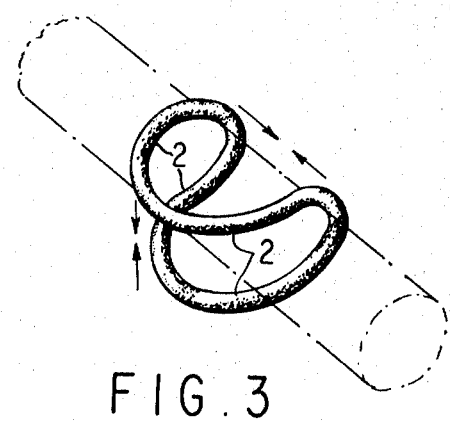
FIG.3
INVENTOR
FRANK LIPINSKI 3,438,614
TOWER PACKING
Frank Lipinski, 61 Magnolia Lane,
Jericho, N.Y. 11753
Filed Sept. 22, 1967, Ser. No. 669,912
Int. Cl. B01d 57/00
U.S. Cl. 261—98           4 Claims

Packing elements having a three-dimensional, hollow geometrical structure which fit within a substantially spherical or ellipsoidal outline which provides efficient means for mass transfers and a tower for treating a gas.

Prior art

Many forms of packing elements are known, but until now none of the said packing elements have been able to satisfactorily fulfill all the desired requirements therefor which are (1) a large wetted surface and a large free volume in the packed tower, (2) high interstitial liquid holdup, (3) a large number of liquid phase renewal points, (4) minimum interlocking of packing elements, (5) sufficient degree of nesting for more surface area per gross volume without appreciably decreasing the free volume, (6) homogenous cross-section of packed tower, (7) light weight and (8), simple, economical method of manufacture.

Objects of the invention

It is an object of the invention to provide novel packing elements which will provide efficient transfer of a volatile component in a vapor phase to be absorbed in a liquid phase or the transfer of a volatile component in the liquid to the vapor phase.

It is another object of the invention to provide a novel packing elemnet for demisting or removing fine liquid particles from gases.

It is another object of the invention to provide a novel improved tower for liquid gas contact processes or demisting gases of liquid mists.

These and other objects and advantages of the invention will become obvious from the following detailed description.

The invention

The novel packing element of the invention is comprised of a three-dimensional, hollow geometrical structure which fits within a substantially spherical or ellipsoidal outline and has a plurality of narrow bands lying upon the curved surface of the outline, the distance between adjacent bands being greater than the width of the bands. The preferred outline of the packing element is spherical although it may also be spheroidal, ellipsoidal or nearly ellipsoidal.

The tower packing element of the invention provide an efficient and improved means for mass transfers and liquid-gas contact due to the large free volume which permits low pressure drop on the gas phase and to the large surface area to be wetted and high interstitial liquid holdup which gives greater transfer per unit gross volume of packing. Liquid passing down through a tower filled with the said packing elements forms drops which break up and then reform resulting in renewal of the liquid surface which aids in the mass transfer between the liquid and gas phases. The homogenous cross-section of apparatus using the packing element of the invention reduces channelling to a minimum which increases efficiency of the apparatus and results in a more consistent and more predictable performance.

Another advantage of the invention is that the packing elements are produced from inexpensive material with a minimum of operations. Moreover, the minimum degree of interlocking of the packing elements makes easier handling when charging or discharging the apparatus with the said packing elements because of a minimum number of clusters of the packing elements.

The packing elements of the invention may be made by forming a ring of the packing material into the desired curvilinear shape. The ring of packing material is preferably a circular ring of a solid wire or hollow tubing formed into a sphere although the starting rings may have an elliptical, oval or chain-link shape or similar shape. The cross-section of the ring may be circular, square, triangular or any random shape. The exterior surface of the ring is preferably smooth, but it may be roughened, serrated, notched, grooved, etc.

The packing material may be made of any metal or alloy of metals, or plastic or ceramic materials or a combination thereof, such as plastic coated or rubber coated or ceramic coated metals. The packing material may be a ring of continuous material such as wire or tubing or it may be a stranded material such as stranded wire. The specific material is governed by choice as long as the packing material is resistant to the gas and liquid with which the packing elements are to be contacted with.

The ring of the packing material which is to be formed into the packing element of curvilinear shape may be a continuous ring, a split ring with joined ends or a ring with unjoined ends as long as it holds the shape of the final configuration. If necessary, constraints such as sealing compounds or wires wrapped about the adjacent sections of the packing element may be used to hold the final configuration.

Referring now to the drawings:

FIG. 1 is a cross-sectional view of the packing element of the invention wherein the curvilinear outline is spherical.

FIG. 2 is a cross-sectional view of the packing element of FIG. 1 taken along the line 2—2.

FIG. 3 is a view of the packing element of FIG. 1 after the first bending step in its production.

FIG. 4 is a vertical section of a reaction tower containing the packing elements of the invention with parts of the apparatus being shown in elevation.

The packing element of FIG. 1 is a three-dimensional hollow structure fitting with a spherical outline 1 and having four spaced bands 2 lying upon the surface of the spherical outline and being joined at opposite ends 3 and 4 of the diameter of the sphere. The space between two adjacent bands 2 is greater than the width of the said bands. This allows nesting of the packing elements when used in a tower which provides more surface area per gross volume without appreciably decreasing the free-volume and a large number of liquid phase renewal points.

The packing element of FIGS. 1 and 2 has 4 narrow bands about its outline and this is the preferred embodiment due to the ease of producing the said elements, however, the elements may have 3 to 10 bands or more, provided the space between adjacent bands is greater than the width of the said bands. Packing elements of this nature may be formed by bending a plurality of individual wires in a 180° arc and joining the wires together in a spherical form, for example. The spherical outline is preferred since this outline gives the highest degree of uniformity and more packing per cubic inch of volume in the packer tower.

The packing element of FIGS. 1 and 2 may be simply formed by bending a round ring or oval of wire 360° about a round rod having a diameter approximately onethird of the diameter of the round ring whereby it has the shape shown in FIG. 3. The ring of FIG. 3 is then rotated 90° and bent about the round rod again or the two loops may be pinched together so they meet at a point opposite point 3. Points 3 and 4 where the bent ring touches need not be constrained if the wire used is sufficiently stiff to hold the spherical shape but they may be constrained in any convenient fashion if necessary.

FIG. 4 illustrates schematically a tower 5 packed with packing elements 6 of the invention. Liquid enters the tower 5 through inlet pipe 7 to liquid distributor 8 and passes through the packed tower 5 and is removed at liquid outlet 9. The vapor to be passed through the tower enters the lower part of the tower through pipe 10, and is removed at vapor outlet 11 after liquid-gas contacting operation has been effected. Depending upon the specific use of the tower, it may be packed with elements of the same size or elements of varying sizes or elements of varying number of bands. If a variety of different elements are to be used, it is most advantageous to use layers of uniform packing elements.

Various modifications of the packing elements and packed tower of the invention may be made without departing from the spirit or scope thereof and it is to be understood that the invention is to be limited only as defined in the appended claims.

I claim:

1. A packing element comprising a three-dimensional, hollow geometrical structure which fits within a substantially spherical outline and is formed by bending two pairs of opposite sides of a ring on perpendicular diameters about 180° until they touch or almost touch so that the axis of the ring continually curves in three dimensions and two lines tangent to both the touching points of the ring and the spherical outline are perpendicular to each other if brought together without rotation along the diameter of the spherical outline connecting the said points and where the axis of the ring is separated from the spherical outline by approximately one-half of the thickness of the ring used to form the packing element.

2. A tower for treating a gas and a liquid which tower contains a bed of the packing elements of claim 1.

3. A tower for removing liquid mists from gases which tower contains a bed of the packing elements of claim 1.

4. A packing element comprising a three-dimensional, hollow geometrical structure which fits within a substantially ellipsoidal outline and is formed by bending two pairs of opposite sides of a ring on perpendicular diameters about 180° until they touch or almost touch so that the axis of the ring continually curves in three dimensions and two lines tangent to both the touching points of the ring and the ellipsoidal outline are perpendicular to each other if brought together without rotation along the diameter of the ellipsoidal outline connecting the said points and where the axis of the ring is separated from the ellipsoidal outline by approximately one-half of the thickness of the ring used to form the packing element.

References Cited

UNITED STATES PATENTS

| 2,212,932 | 8/1940 | Fairlie | 261—94 |
| 2,332,110 | 10/1943 | Podbielniak | 261—94 |
| 3,266,787 | 8/1966 | Eckert | 261—94 |
| 3,324,630 | 6/1967 | Teller et al. | 55—233 XR |

FOREIGN PATENTS 565,151 11/1932 Germany.

TIM R. MILES, *Primary Examiner.*

U.S. Cl. X.R.

55—512